United States Patent
Huber

(10) Patent No.: US 8,141,360 B1
(45) Date of Patent: Mar. 27, 2012

(54) HYBRID GAS TURBINE AND INTERNAL COMBUSTION ENGINE

(75) Inventor: David J Huber, Tequestra, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 1441 days.

(21) Appl. No.: 11/254,207

(22) Filed: Oct. 18, 2005

(51) Int. Cl.
F02B 33/44 (2006.01)
F01K 23/10 (2006.01)
B60K 6/20 (2007.10)
F02D 29/06 (2006.01)
H02P 9/04 (2006.01)

(52) U.S. Cl. ............... 60/606; 60/618; 60/597; 60/598; 290/40 B

(58) Field of Classification Search .............. 60/606, 60/616, 618, 597–598; 290/40 B
See application file for complete search history.

(56) References Cited

U.S. PATENT DOCUMENTS

| | | | | | |
|---|---|---|---|---|---|
| 2,122,280 | A | * | 6/1938 | Diedrich | 60/618 |
| 2,216,494 | A | * | 10/1940 | Kurtz et al. | 60/606 |
| 2,503,289 | A | * | 4/1950 | Nettel | 60/606 |
| 2,583,430 | A | | 1/1952 | Kadenacy | |
| 2,585,029 | A | * | 2/1952 | Nettel | 60/606 |
| 2,585,968 | A | * | 2/1952 | Schneider | 60/606 |
| 2,620,621 | A | * | 12/1952 | Nettel | 60/606 |
| 2,664,957 | A | * | 1/1954 | Catford et al. | 416/34 |
| 2,873,574 | A | * | 2/1959 | Webb | 60/606 |
| 3,007,302 | A | * | 11/1961 | Vincent | 60/598 |
| 3,090,194 | A | * | 5/1963 | Glamann | 60/608 |
| 3,163,984 | A | * | 1/1965 | Dumont | 60/606 |
| 3,167,913 | A | * | 2/1965 | Muhlberg et al. | 60/780 |
| 3,350,876 | A | | 11/1967 | Johnson | 60/618 |
| 3,513,929 | A | | 5/1970 | Dae Sik Kim | 60/712 |
| 3,672,160 | A | | 6/1972 | Kim | |
| 3,676,999 | A | * | 7/1972 | Oldfield | 60/606 |
| 3,961,199 | A | * | 6/1976 | Bronicki | 60/606 |
| 3,986,575 | A | | 10/1976 | Eggmann | 60/616 |
| 3,990,242 | A | * | 11/1976 | Muller | 60/597 |
| 4,287,717 | A | * | 9/1981 | Oldfield et al. | 60/606 |
| 4,356,696 | A | * | 11/1982 | Mason | 60/606 |
| 4,452,043 | A | * | 6/1984 | Wallace | 60/606 |
| 4,470,476 | A | | 9/1984 | Hunt | |
| 4,586,338 | A | | 5/1986 | Barrett et al. | |
| 4,590,384 | A | | 5/1986 | Bronicki | 290/40 B |
| 5,000,003 | A | | 3/1991 | Wicks | |
| 5,029,442 | A | * | 7/1991 | Nishiyama | 60/606 |

(Continued)

FOREIGN PATENT DOCUMENTS

GB  1473542 A * 5/1977

(Continued)

Primary Examiner — Thai Ba Trieu
(74) Attorney, Agent, or Firm — John Ryznic

(57) ABSTRACT

A hybrid engine having a gas turbine engine and an internal combustion engine, both engines driving a common drive shaft. The compressor delivers compressed air to the combustor and to an inlet of the internal combustion engine, the compressed air picks up heat from the internal combustion engine either from the combustion process or through a heat exchanger, and is delivered to the combustor. When the gas turbine engine is not operating by burning fuel, the heated compressed air from the internal combustion engine is used to maintain the shaft speed sufficient for starting the gas turbine engine without the need to bring the turbine engine up to speed prior to ignition. The apparatus and process of the present invention provides a hybrid engine that is light weight, fuel efficient, and with enough available power for high powered situations.

22 Claims, 2 Drawing Sheets

U.S. PATENT DOCUMENTS

| | | | |
|---|---|---|---|
| 5,239,830 A | 8/1993 | Banthin et al. | |
| 5,284,018 A | 2/1994 | Koontz et al. | |
| 5,351,487 A | 10/1994 | Abdelmalek | |
| 5,673,560 A * | 10/1997 | Hope | 60/606 |
| 5,762,156 A | 6/1998 | Bates et al. | 180/165 |
| 5,826,673 A | 10/1998 | Bates et al. | 180/165 |
| 6,253,545 B1 | 7/2001 | Suzuki | |
| 7,174,714 B2 * | 2/2007 | Algrain | 60/608 |
| 2007/0234721 A1 * | 10/2007 | Vuk | 60/608 |

FOREIGN PATENT DOCUMENTS

| | | | |
|---|---|---|---|
| GB | 2283064 A * | 4/1995 | |
| JP | 54156918 A * | 12/1979 | |
| JP | 01056920 A * | 3/1989 | |
| JP | 04124428 A * | 4/1992 | |

* cited by examiner

HYBRID GAS TURBINE AND INTERNAL COMBUSTION ENGINE

RESEARCH STATEMENT

None.

CROSS-REFERENCE TO RELATED APPLICATIONS

None.

BACKGROUND OF THE INVENTION

1. Field of the Invention

The present invention relates to a gas turbine engine, and more specifically to a hybrid gas turbine and internal combustion engine.

2. Description of the Related Art Including Information Disclosed Under 37 CFR 1.97 and 1.98

Historically, gas turbines have not been competitive with other internal combustion engines in applications where a large portion of the mission is spent at power levels significantly below maximum power, and where their inherent power density and emissions advantages are not substantially valued. This is due to the steep falloff in gas turbine thermal efficiency as power is reduced, resulting in unacceptable low-power fuel consumption. This shortcoming has historically been addressed by the addition of a recuperator, which not only increases thermal efficiency at maximum load, but also reduces the efficiency lapse rate as load is reduced. In addition to the recuperator, variable power turbine inlet guide vanes are sometimes also included to further reduce the efficiency lapse.

Still, even the recuperated gas turbine with variable power turbine inlet guide vanes realizes a severe thermal efficiency lapse when throttled from maximum load to low power settings. This is primarily the result of reductions in both cycle pressure ratio and turbine inlet temperature. The optimal throttling scheme typically consists of first shutting power turbine variable guide vanes (VGVs), and then reducing turbine inlet temperature (TIT). Gas generator shaft speed is reduced during throttling, resulting in corresponding reductions in flow and pressure ratio (per the gas generator operating line) Reduction in turbomachinery efficiency as power is reduced further exacerbates the problem.

Even ignoring the above problems, recuperators themselves have other issues preventing their widespread assimilation into the power generation markets. They are typically large and heavy, inhibiting their use in vehicular applications. Additionally, due to thermal stresses caused by cyclic duty (i.e. intermittent duty on-off operation and excursions from low to high power), recuperators are prone to fatigue and cracking, resulting in leaks which severely impact performance. The result is that recuperators are typically costly and difficult to manufacture, requiring large amounts of welding and many fabrication steps.

For vehicular power, the incumbent gasoline and diesel piston engines represent refinement of these designs over many decades of development. However, these engines exhibit inherently low power density, and the throughput of working fluid (air) is generally very low in comparison to the weight and volume of the engine. Furthermore, these engines produce large concentrations of harmful emissions such as nitrogen oxides, carbon monoxide, and unburned hydrocarbons, and require that a large amount of costly emission reduction equipment be added to the engine system to reduce emissions to acceptable levels. Even then, emission levels are far worse that those of gas turbines.

As federal regulations continue to tighten emission requirements for gas and diesel engines, more esoteric and costly technologies are required, such as direct-injection and variable valve timing. These technologies, while helpful to reducing emissions, add to engine cost and complexity.

Another approach finding its way into the vehicular engine market is that of the hybrid engine. Typically, this entails using a small internal combustion engine that provides the average power needed by the vehicle (typically 10-30% of maximum power demand), along with the use of an energy storage device, typically a bank of batteries, to provide maximum power for short periods of time during the mission. While substantial improvements in vehicle fuel economy and range can be realized by such systems, the required battery banks are generally very voluminous and heavy while adding cost, resulting in only small savings in vehicle weight, and a substantial increase in cost. A typical battery arrangement in a hybrid vehicle might weight 1000 lbs. while the vehicle without the battery would weight 2000 lbs. Eliminating the battery would reduce the vehicle weight by one third.

It is therefore an object of the present invention to improve the overall efficiency of a vehicle power plant.

It is another object of the present invention to reduce the weight of the vehicle power plant without reducing the power produced by eliminating the need for heavy batteries.

It is still another object of the present invention to improve the response time for a gas turbine engine by spinning the turbine while the gas turbine engine is not producing power.

BRIEF SUMMARY OF THE INVENTION

A hybrid gas turbine and internal combustion engine configuration is claimed that exhibits high volumetric and mass-specific power density as well as high thermal efficiency across the entire range of power settings from idle to maximum power, thereby benefiting applications such as vehicular propulsion where a large portion of the operational mission is spent at power levels significantly below maximum power. It avoids the severe efficiency degradation typically found in gas turbines as they are throttled from maximum power to idle, allowing gas turbine power density while maintaining internal combustion engine (i.e. reciprocating 2 or 4 stroke Otto cycle spark-ignition and Diesel cycle compression-ignition piston engines, as well as direct-injected derivatives thereof, and rotary or Wankel engines) mission fuel consumption, resulting in improved vehicle fuel economy, range, and performance.

Specifically, the claimed hybrid gas turbine and internal combustion engine uses a combination of a small internal combustion engine and a gas turbine, whereby the internal combustion engine provides substantially all of the power at low power demand (typically 10-30% of maximum power demand, though this is only a representative range). At medium and high power demand the gas turbine engine, which is maintained at a shaft speed sufficient for starting at all times during the mission, is supplied with fuel and ignition source, resulting in near instantaneous starting for all power demand above that of the capability of the small internal combustion. This concept is an enabling technology for the competitiveness of gas turbine systems in applications where the vast majority of mission time is spent at low power. Such applications include, but are not limited to, vehicular applications such as automotive and marine propulsion, tank and armored vehicle propulsion, heavy and light truck propulsion, aircraft propulsion, and stationary power generation.

The concept provides performance comparable to that of internal combustion engines currently used in such applications (i.e. reciprocating two and four-stroke Otto spark-ignition and Diesel compression-ignition piston engines, as well as direct-injected derivatives thereof, and rotary or Wankel engines), but at substantially higher volumetric and mass-specific power densities, resulting in large savings in engine weight and volume, and enabling improved vehicle capability and performance.

Attempts by others to use recuperated gas turbines in these applications have failed to achieve widespread acceptance due to the inherent weight, volume, cost, and maintenance/reliability issues of recuperated systems. The proposed system avoids these problems and provides a low-cost, compact and lightweight power system which exhibits the high power density and high fuel efficiency needed for such applications, while also featuring low maintenance, high reliability and durability, long life, fuel flexibility, and ultra-low emissions without the need for emissions control equipment.

DETAILED DESCRIPTION OF THE INVENTION

Figure 1:
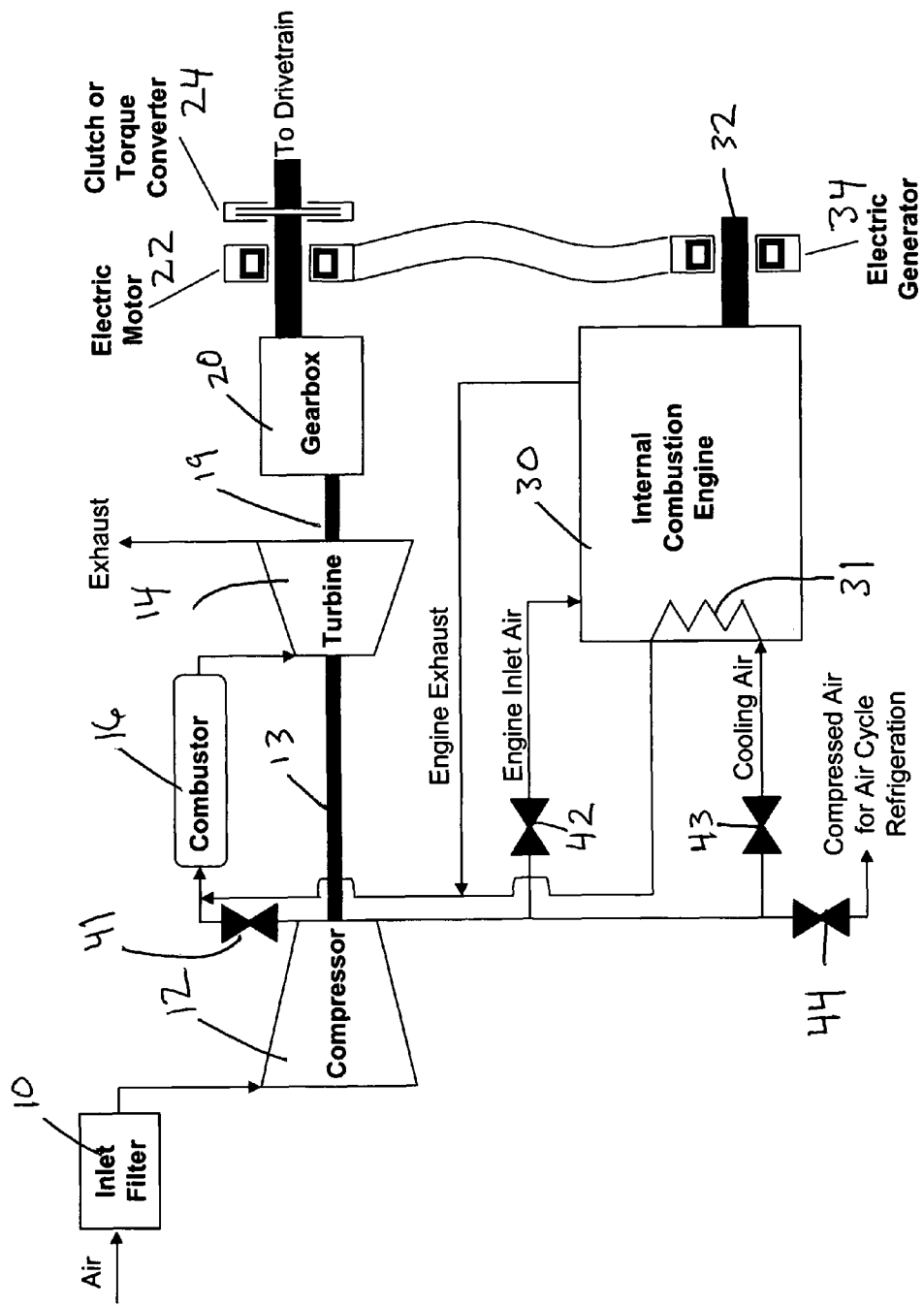
FIG. 1 shows a hybrid gas turbine and internal combustion engine in a single shaft configuration.

A hybrid gas turbine and internal combustion engine configuration is disclosed that exhibits high volumetric and mass-specific power density as well as high thermal efficiency across the entire range of power settings from idle to maximum power, thereby benefiting applications such as vehicular propulsion where a large portion of the operational mission is spent at power levels significantly below maximum power. It avoids the severe efficiency degradation typically found in gas turbines as they are throttled from maximum power to idle, allowing gas turbine power density while maintaining internal combustion engine mission fuel consumption, resulting in improved vehicle fuel economy, range, and performance.

Specifically, the disclosed hybrid gas turbine and internal combustion engine uses a combination of a small internal combustion engine and a gas turbine, whereby the internal combustion engine provides substantially all of the power at low power demand (typically 10-30% of maximum power demand, though this is only a representative range). At medium and high power demand the gas turbine engine, which is maintained at a shaft speed sufficient for starting at all times during the mission, is supplied with fuel and ignition source, resulting in near instantaneous starting for all power demand above that of the capability of the small internal combustion engine. This concept is an enabling technology for the competitiveness of gas turbine systems in applications where the vast majority of mission time is spent at low power.

The concept provides performance comparable to that of internal combustion engines currently used in such applications (i.e. reciprocating two and four-stroke Otto spark-ignition and Diesel compression-ignition piston engines, as well as direct-injected derivatives thereof, and rotary or Wankel engines), but at substantially higher volumetric and mass-specific power densities, resulting in large savings in engine weight and volume, and enabling improved vehicle capability and performance. While the efficiency of the gas turbine system may be less than that of the current incumbent internal combustion engine sized for maximum power demand, the additional fuel consumption during the brief portion of mission time spent at elevated power levels is more than offset by the fuel savings achieved via operation of the small internal combustion engine near its peak efficiency level for substantially all of its operating time, and reduced vehicle size and weight. The result is lower fuel consumption over the course of the mission. An additional benefit is the low operating time of a large portion of the engine power capacity, resulting in improved life and reduced maintenance for the gas turbine.

The proposed system provides a low-cost, compact and lightweight power system which exhibits the high power density and high fuel efficiency needed for such applications, while also featuring low maintenance, high reliability and durability, long life, fuel flexibility, and ultra-low emissions without the need for emissions control equipment.

A hybrid gas turbine and internal combustion engine configuration is claimed that provides high thermal efficiency from idle to maximum power. A diagram of the proposed configuration is shown in FIG. 1. The hybrid engine comprises an inlet filter 10 leading into a compressor 12, a turbine 14 connected by a rotary shaft 13 to the compressor 12, a combustor 16 to burn a fuel with compressed air supplied from the compressor 12 and deliver a hot gas stream to the turbine 14, a gearbox 20 driven by an output shaft 19 of the turbine 14 to reduce the rotational speed of the turbine, an electric motor 22 connected to an output shaft of the gearbox 20, a clutch or torque converter 24 to selectively disengage a drive train from the gearbox shaft, an internal combustion engine 30 that drives an output shaft 32, an internal cooling circuit 31 for the ICE 30, and an electric generator 34 driven by the internal combustion engine 30. The electric generator supplies electric power to the electric motor 22 of the drive train.

Several valves are used to control air flow through the hybrid system. A combustor inlet valve 41 is used to block compressor outlet air to the combustor. An engine inlet air valve 42 controls air flow from the compressor 12 to the inlet of the ICE 30. a cooling air flow valve 43 controls air flow from the compressor 12 to the cooling circuit within the ICE 30. An air cycle refrigeration valve 44 controls air flow from the compressor 12 to an air cycle refrigeration circuit external to the hybrid engine.

Ambient air is first drawn by suction through the inlet filter 10, and then compressed in the gas turbine compressor 12. The compressor exhaust flow then splits into several flows. One flow through air inlet valve 42 is provided as the super-charged inlet flow to the internal combustion engine 30, which operates continuously throughout the mission. After passing through the internal combustion engine 30, the flow emerges as hot, pressurized exhaust and passes to the combustor 16 of the gas turbine. Another flow path may exist that takes compressor discharge air into the cooling circuit of the internal combustion engine through cooling air valve 43, where additional waste heat may be recovered for use in the gas turbine. This flow also returns to the gas turbine combustor 16. Yet another potential flow path for compressor discharge flow is an off take bleed for use in an air cycle for refrigeration through the air cycle refrigeration valve 43. Finally, there is a flow path leading directly from the compressor 12 discharge to the gas turbine combustor 16 through combustor inlet valve 41.

During operation at low power levels, the gas turbine combustor 16 provides no fuel and the combustor inlet flow merely passes to the turbine expander 14 without heat addition. Additionally at low operating power levels, the degree of supercharging of the air by the gas turbine compressor 12 may be very modest, as the primary purpose of the system is to provide air to the internal combustion engine 30 and maintain gas turbine shaft speed at the level required for gas turbine starting. At high power levels, fuel and an ignition source are provided to the gas turbine combustor 16.

The gas turbine expander 14 expands the resulting flow and exhausts it to the atmosphere. The net power output (or power input requirement) of the gas turbine is delivered though a shaft and gearbox 20, which reduces the shaft speed to that of the drive train. The drive train includes an electric motor 22 for operation as described below, and a clutch or torque converter 24 to release the engine system from the drive train. The internal combustion engine 30 drives an electric generator 34 which provides the power input to the electric motor 22.

Note that a notional operating concept is provided below, but that many such concepts may be developed for the above-defined system. The system operation is as follows:

For starting, a small battery is used to provide power input to either a dedicated starter motor, or alternatively the electric generator 34 of the internal combustion engine 30 can be supplied with this power and used as a starting motor. As the internal combustion engine 30 starts and proceeds to idle operation, it pulls air through the gas turbine compressor 12 and begins rotating the gas turbine shaft. Note that for starting, the control valve 41 connecting the compressor 30 directly to the combustor 16 may be completely closed, to allow more rapid starting of gas turbine shaft rotation. As hot exhaust is returned to the gas turbine combustor 16 (which at this point is providing no fuel) and turbine expander 14, the expander begins to generate power and the resulting operation is similar to that of a turbocharged engine (except that in this case the turbomachinery is far larger in design flow size than a turbocharger would be for the same application). The valve 41 connecting the compressor 12 discharge directly to the combustor 16 may then be opened, as flow direction is now established through the gas turbine, or it may remain closed depending upon the exhaust pressure characteristics of the particular internal combustion engine 30. The actual setting for this valve 41 is to be determined after study of both transient and steady-state performance characteristics of the claimed system, and can be modulated along with other control valves to control compressor match.

The engine cooling circuit 31 is also opened at starting, allowing some of the compressor discharge flow to pass through the internal combustion engine's cooling passages, where waste heat is removed by the cooling air and transported to the gas turbine. As mentioned above, another portion of the compressor discharge flow may be taken starting at this time for use in bringing up an air cycle refrigeration system.

Once at steady-state idle, the gas turbine shaft is rotating at a speed driven by the internal combustion engine's 30 waste heat, in a (relatively low) efficiency bottoming cycle. However, the significance of the gas turbine shaft speed towards allowing rapid start of the gas turbine is the true intent of the system. Typically, gas turbines take on the order of 30 seconds or more to go from static to idle. With the gas turbine shaft always turning at a speed sufficient to instantly start the gas turbine and add additional power as required, the true utility of the configuration becomes apparent, that of using a gas turbine bottoming cycle driven by the waste heat of the internal combustion engine 30 to offset most or all of the parasitic losses that would result from holding the gas turbine shaft at the desired starting speed. That is, instead of mechanically driving the gas turbine shaft at all times to maintain sufficient starting speed (which would significantly reduce fuel economy due to gas turbine parasitic and aerodynamic losses), the gas turbine itself is used as a bottoming cycle for the internal combustion engine, and derives the power required to maintain the needed gas turbine shaft speed by converting the waste heat from the internal combustion engine 30.

When power demand from the system is low, substantially all the power is supplied by the internal combustion engine 30 through its generator 34 to the electric motor 22. Note that the electric motor 22 also turns the gas turbine shaft. Depending upon the parameters of both the gas turbine and the internal combustion engine 30, including sizing, the gas turbine shaft may require a small power input, be power balanced, or producing a small net output power. The significance and intent is not the power input/output status of the gas turbine shaft, but rather that a large percentage or the entire parasitic load required to maintain the gas turbine shaft at starting speed is provided by utilizing waste heat from the internal combustion engine 30. As power demand increases, it is initially met by increased throttle setting on the internal combustion engine 30, which also then draws more airflow through the gas turbine compressor 12, and provides increased waste heat from the exhaust and cooling circuit 31 to the gas turbine expander. This further increases the speed of the gas turbine shaft. Note that during this mode of operation, the gas turbine may provide only minimal supercharging of the internal combustion engine 30 inlet air, depending upon the flow configuration utilized. For example, if large quantities of compressor 12 discharge air are bypassed directly into the combustor 16.

When the power demand on the system becomes more than the internal combustion engine 30 can deliver by itself, the gas turbine combustor 16 is provided with fuel and an ignition source, and the gas turbine, which has been driven to a speed sufficient to start by the internal combustion engine 30, starts and provides the additional power required, with the fuel controller providing the required fuel input up to the maximum turbine inlet temperature TIT and power output capabilities of the gas turbine. Note that to meet the desired starting speed for the gas turbine at the maximum internal combustion engine throttle setting, variable geometry may be required in the gas turbine compressor 12 and/or turbine 14, though this adds cost and complexity to the system.

Note also that during gas turbine firing, the degree of supercharge to the internal combustion engine 30 is increased substantially, and therefore the internal combustion engine 30 must be design to accommodate the increased operating pressures and temperatures, or alternatively the air for the internal combustion engine 30 may be drawn directly from the environment under these operating conditions.

A key advantage of the claimed hybrid gas turbine and reciprocating engine system is that the gas turbine engine, which normally may take up to a minute to start, is capable of generating power almost instantaneously, as the gas turbine shaft speed is maintained at a level sufficient for starting.

When power demand decreases from high power, the gas turbine is first throttled using the fuel control to reduce firing temperature, and then is shut down (fuel and ignition to the gas turbine turned off) once power drops to a level that can be met by the internal combustion engine alone.

Note that, since the intended applications are those that spend only a small fraction of mission time at high power, the vast majority of power generating capacity is idle (only spinning slowly) for most of the mission, resulting in long life for the gas turbine. However, the gas turbine may endure many cycles of operation.

Another key feature of the system is the decoupling of the differing speed requirements of the gas turbine and the internal combustion engine 30 by use of the generator 34 and electric motor 22. This allows both engines to be operated efficiently and without negative impact to the other engine. Yet another advantage is the availability of high-quality electricity from the generator 34, allowing for elimination of the alternator and starter motor on the internal combustion engine 30.

The result is a compact, lightweight system for the intended missions, similar to those for automotive applications. As a competing technology for existing hybrid vehicles using small internal combustion engines with banks of batteries for peak power, the proposed system is much lighter and more compact, resulting in improved vehicle performance. The system also potentially replaces the starter motor, alternator, air conditioning condenser, evaporator, and pump, water cooling system (radiator, pump, etc.), and transmission. Also very important is the fact that peak power production is available continuously if necessary, as long as there is fuel available, and is not limited by battery capacity. Note that for the claimed systems it is also possible to add a vehicle regenerative braking system using the electric motor as a generator, if a relatively small battery pack is added for energy storage during deceleration. Even at 20% conversion efficiency from fuel chemical energy to shaft power, the claimed approach using a gas turbine effectively has 10 times the mass energy density and 4 times the volume energy density of the best Lithium Ion batteries currently used in hybrid vehicles.

The above embodiment of FIG. 1 and discussion describes the configuration and operation of a hybrid gas turbine and internal combustion engine in a single-shaft configuration. That is, the gas turbine compressor 12 and turbine expander 16 are mounted on a single shaft that enters the gearbox 20. While this is mechanically the simplest of arrangements, it carries with it several operating concerns. While the gas turbine shaft speed typically doubles when going from idle to maximum power, the drive train speed may undergo a much larger speed increase, particularly if loaded from a low or static initial condition. Therefore, this single-shaft arrangement will require a transmission to handle the speed change difference between the gas turbine and the drive train. This in itself poses yet other potential challenges, since the gas turbine will undergo large amplitude torque and speed fluctuations, and its large torque may make design of a durable transmission difficult. Note however it is possible to avoid the need for a reverse gear if high reverse power levels are not required, since the electric drive motor may easily be operated in reverse.

Figure 2:
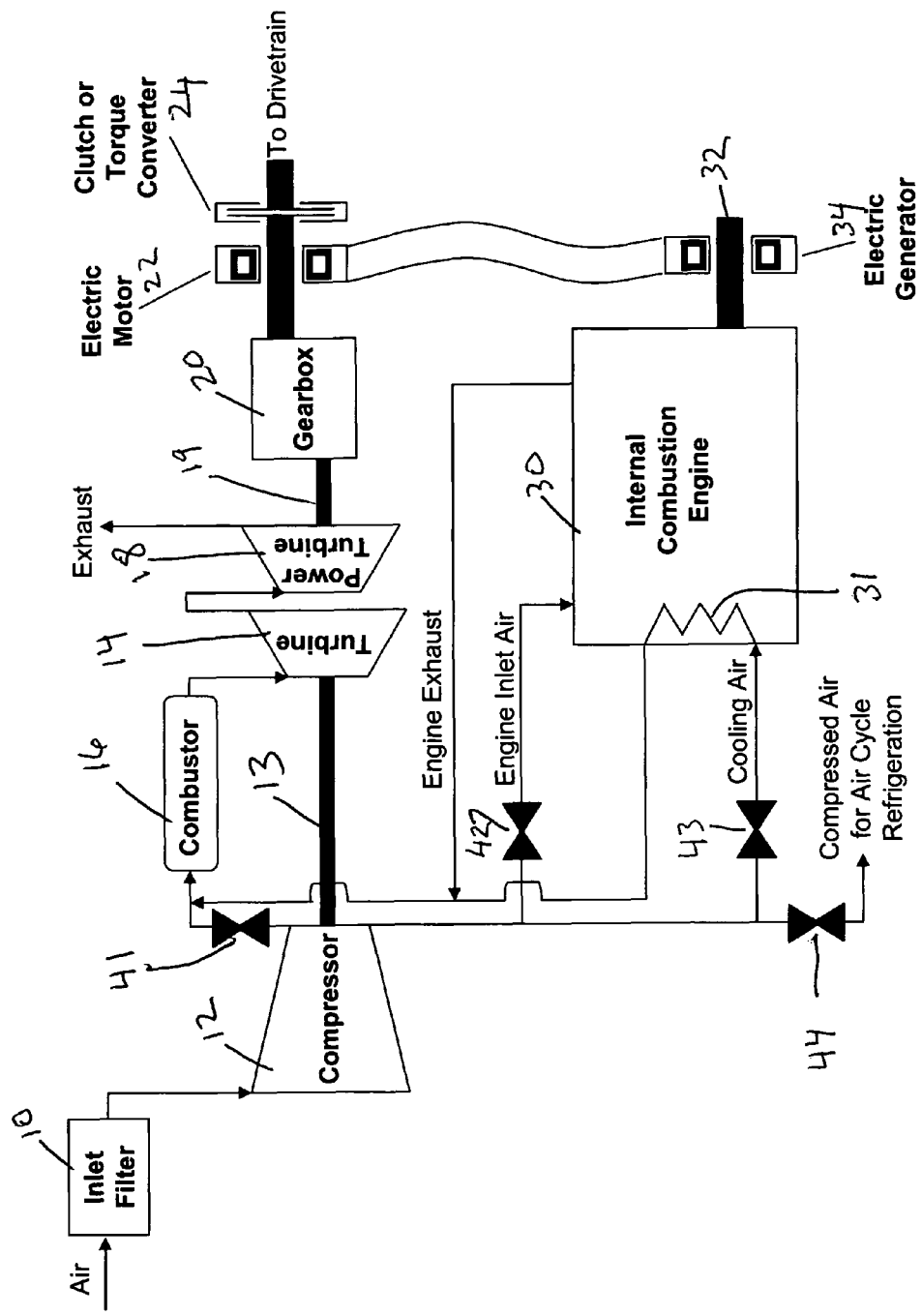
FIG. 2 shows a hybrid gas turbine and internal combustion engine in a two-shaft configuration.

An alternative configuration is shown in FIG. 2 below. This is a two-shaft configuration, where the gas turbine compressor 12 and a turbine 14 sufficient to drive the compressor 12 are on one shaft 13, and a separate power turbine 18 is on a separate shaft 19 connected to the gearbox 20. This configuration has several potential advantages over the single-shaft arrangement of FIG. 1. It avoids the speed range mismatch found in the single-shaft configuration. The power turbine is connected to the driveshaft, and is capable of operating over a very wide speed range at high efficiency and therefore high torque. Therefore, it is possible that such a configuration could avoid the need of a transmission altogether, saving vehicle cost, space, and weight, and further improving performance. Addition of variable guide vanes at the power turbine 18 inlet may also increase performance and operational flexibility of the system. For this configuration, operation is generally the same as described above for the single-shaft configuration of FIG. 1, except that only the power turbine 18 is connected to the driveshaft, and the remainder of the gas turbine is on a separate shaft 13 that is free spinning.

Yet another embodiment would be either of the two above-described configurations, where the internal combustion engine is replaced by a fuel cell. Solid Oxide Fuel Cell (SOFC) gas turbine combined cycles are well-known in the art, and exhibit exceptionally high thermal efficiencies. In such arrangements, a recuperated gas turbine is integrated with the SOFC, where the SOFC effectively acts as the gas turbine combustor. The gas turbine in this arrangement acts as a bottoming cycle for the SOFC at all times, and typically represents only about 15-20% of the total output of the system. The embodiment claimed herein applies the above configurations by replacing the internal combustion engine with the SOFC, and thus creates an SOFC gas turbine combined cycle with a much larger gas turbine than typically used, increasing the size of the gas turbine for peak power needs, resulting in a maximum gas turbine output that may greatly exceed the output of the SOFC. Note in this configuration, the recuperator size is unchanged and is sized to the SOFC, not the gas turbine, resulting in a compact power system.

Similarly, other fuel cells technologies may be utilized in place of the internal combustion engine, such as molten carbonate, phosphoric acid, proton exchange membrane, and direct alcohol fuel cells. Each fuel cell technology generally provides different quantities and qualities of heat from its exhaust and cooling streams (if present), but the integration with the gas turbine is similar in configuration to the figures above.

Other embodiments can be derived by using only some of the control valves shown in the above figures, or by removing some of the potential compressor discharge flow paths, such as the air cycle refrigeration air. Embodiments are claimed to encompass all such combinations of valving control and flow path inclusion, along with the potential for variable geometry in the compressor and turbines, and also compressor and turbine bleed locations to bypass portions of the turbomachinery in order to optimize operation across the mission.

Additionally, a wide range of component geometries may be incorporated into the claimed power system, including but not limited to both radial (centrifugal) and axial flow turbomachinery geometries.

I claim the following:

1. A process of operating a hybrid engine, the hybrid engine including a gas turbine engine and an internal combustion engine both connected to a common drive train, the process comprising the steps of:
   supplying compressed air from the compressor of the gas turbine engine to the internal combustion engine;
   transferring heat from the internal combustion engine to the compressed air and delivering the heated compressed air to the combustor of the gas turbine engine; and,
   using the heated compressed air delivered to the combustor to maintain the turbine at a shaft speed sufficient for starting the gas turbine engine.

2. The process of operating a hybrid engine of claim 1, and further comprising the steps of:
   supplying compressed air from the compressor to an inlet of the internal combustion engine; and,
   delivering an exhaust of the internal combustion engine to the combustor to maintain the shaft speed sufficient for starting the gas turbine engine.

3. The process of operating a hybrid engine of claim 1, and further comprising the steps of
   supplying compressed air from the compressor to a heat exchanger in the internal combustion engine; and, delivering the compressed air from the heat exchanger to the combustor to maintain the shaft speed sufficient for starting the gas turbine engine.

4. The process of operating a hybrid engine of claim 1, and further comprising the step of:
regulating the flow of compressed air from the compressor to the internal combustion engine and to the combustor by a plurality of flow control valves.

5. The process of operating a hybrid engine of claim 1, and further comprising the step of:
maintaining the turbine at a shaft speed sufficient for instantly starting the gas turbine engine.

6. The process of operating a hybrid engine of claim 1, and further comprising the step of:
operating the internal combustion engine continuously and oily operating the gas turbine engine when the power output of the internal combustion engine is insufficient for the drive train.

7. The process of operating a hybrid engine of claim 1, and further comprising the step of:
utilizing the waste heat from the internal combustion engine as a large percentage of the load required to maintain the gas turbine shaft at a starting speed.

8. The process of operating a hybrid engine of claim 1, and further comprising the steps of:
driving an electric generator with the internal combustion engine to produce electric power;
using the electric power to drive an electric motor; and,
driving the turbine shaft and the drive train with the electric motor.

9. The process of operating a hybrid engine of claim 8, and further comprising the steps of:
using the electric motor as a generator in a regenerative breaking system on a vehicle.

10. A hybrid engine, comprising:
a gas turbine engine including a compressor, a combustor, and a turbine having a turbine output shaft;
means to rotatably connect the turbine output shaft to a drive train;
an internal combustion engine having an engine output shaft;
means to rotatably connect the drive train with the internal combustion engine output shaft;
compressed air supply means to deliver compressed air from the compressor to the internal combustion engine to extract heat from the engine;
hot air supply means to deliver hot air from the engine to an inlet of the combustor; and,
valve means to regulate a supply of compressed air from the compressor to both the combustor and the engine.

11. The hybrid engine of claim 10, and further comprising:
the means to rotatably connect the drive train with the internal combustion engine output shaft is an electric motor connected to the drive train, an electric generator connected to the engine output shaft, and means to convey electric power from the generator to the electric motor.

12. The hybrid engine of claim 10, and further comprising:
The means to rotatably connect the turbine output shaft to the drive train includes a gearbox.

13. The hybrid engine of claim 12, and further comprising:
the means to rotatably connect the turbine output shaft to the drive train includes a power turbine connected between the turbine and the gearbox.

14. The hybrid engine of claim 10, and further comprising:
the compressed air supply means delivers compressed air to the inlet of the engine; and,
the hot air supply means delivers hot air from the exhaust of the internal combustion engine.

15. The hybrid engine of claim 14, and further comprising:
the valve means to regulate a supply of compressed air from the compressor to both the combustor and the internal combustion engine is a combustor inlet valve and an engine inlet air valve.

16. The hybrid engine of claim 10, and further comprising:
the compressed air supply means delivers compressed air to an inlet of a heat exchanger in the internal combustion engine; and,
the hot air supply means delivers hot air from an outlet of the heat exchanger of the internal combustion engine.

17. The hybrid engine of claim 16, and further comprising:
the valve means to regulate a supply of compressed air from the compressor to both the combustor and the internal combustion engine is a combustor inlet valve and an engine cooling air valve.

18. The hybrid engine of claim 10, and further comprising:
an electric generator driven by the internal combustion engine to produce electric power;
an electric motor to drive the drive train; and,
means to electrically connect the electric generator to the electric motor.

19. The hybrid engine of claim 18, and further comprising:
the electric motor is capable of driving the turbine shaft.

20. The hybrid engine of claim 18, and further comprising:
a regenerative breaking system associated with the electric motor to produce electric power when breaking a vehicle powered by the drive train.

21. The hybrid engine of claim 10, and further comprising:
a power turbine rotatably connected to the turbine; and,
the power turbine is rotatably connected to the drive train so that the turbine drives the power turbine and the power turbine drives the drive train.

22. The hybrid engine of claim 10, and further comprising:
a first compressed an line connecting the compressor to the combustor;
a first regulating valve located in the first compressed air line to regulate the flow of compressed air from the compressor and into the combustor;
a second compressed air line connecting the compressor to a heat exchanger of the internal combustion engine;
a second regulating valve located in the second compressed air line to regulate the flow of compressed air from the compressor and into the heat exchanger;
a third compressed air line connecting the compressor to the inlet of the internal combustion engine;
a third regulating valve located in the third compressed air line to regulate the flow of compressed air from the compressor and into the internal combustion engine;
a fourth compressed air line connecting the heat exchanger to the combustor; and,
a fifth compressed air line connecting the exhaust of the internal combustion engine to the combustor;
wherein the three regulating valves control the air flow to the internal combustion engine and the combustor so that the internal combustion engine operates continuously and the gas turbine engine only operates when the output power of the internal combustion engine is insufficient to power the drive train, and so that the turbine continues to rotate with enough speed when the gas turbine engine is not operating such that the gas turbine engine can be started almost instantly.

\* \* \* \* \*